United States Patent [19]

Fry

[11] Patent Number: 4,824,165
[45] Date of Patent: Apr. 25, 1989

[54] APPARATUS FOR SELECTIVELY VARYING AIR RESISTANCE ON A LAND TRANSPORT VEHICLE TO OPTIMIZE REDUCTION OF DRAG

[76] Inventor: Stanley E. Fry, 1876 Sherrer Rd., York, S.C. 29745

[21] Appl. No.: 108,685

[22] Filed: Oct. 15, 1987

[51] Int. Cl.⁴ ............................................. B62D 35/00
[52] U.S. Cl. ................................ 296/180.3; 296/180.5
[58] Field of Search .................. 296/1 S, 180.3, 180.5, 296/180.1; 105/1.1

[56] References Cited

U.S. PATENT DOCUMENTS

| D. 252,508 | 7/1979 | Wiley, Jr. | D12/181 |
|---|---|---|---|
| D. 252,619 | 8/1979 | Wiley, Jr. | D12/181 |
| D. 252,620 | 8/1979 | Wiley, Jr. | D12/181 |
| D. 252,621 | 8/1979 | Wiley, Jr. | D12/181 |
| D. 252,622 | 8/1979 | Wiley, Jr. | D12/181 |
| D. 252,623 | 8/1979 | Wiley, Jr. | D12/181 |
| 4,084,846 | 4/1978 | Wiley, Jr. et al. | 296/1 |
| 4,087,124 | 5/1978 | Wiley, Jr. | 296/1 |
| 4,102,548 | 7/1978 | Kangas | 296/1 |
| 4,257,640 | 3/1981 | Wiley, Jr. | 296/1 |
| 4,611,796 | 9/1986 | Orr | 296/1 S |
| 4,693,506 | 9/1987 | Massengill | 296/1 S |

OTHER PUBLICATIONS

Royal-Air Deflector (A Division of Premix, Inc.)—undated.

Primary Examiner—Robert R. Song
Attorney, Agent, or Firm—W. Thad Adams, III

[57] ABSTRACT

An apparatus for selectively varying air resistance on a land transport vehicle to optimize reduction of drag except when drag is desirable as a speed reduction aid. The vehicle typically includes a cab and at least one trailing cargo container. First and second wings are mounted on respective vertical axes on opposite sides of the cab adjacent the rear. Means are provided for moving the wings when desired between a first, relatively low drag position wherein the wings lie substantially flush with the sides of the cab and a second, relatively high drag position wherein the wings project outwardly beyond the sides of the cab and into the air system moving past the cab to increase drag and reduce the braking distance of the vehicle. An air deflector is mounted on the roof of the cab to normally deflect air over the top of the cargo container. The air deflector includes a relatively large opening therein for allowing air to freely pass therethrough and a door positioned in the opening and mounted for movement relative to the door. Means move the door between a first, relatively low drag position wherein the door covers the opening and air is deflected up and over the cargo container and a second, relatively high drag position wherein the door is retracted away from the opening and air is permitted to flow directly through the opening and against the forward end and top of the cargo container.

16 Claims, 5 Drawing Sheets

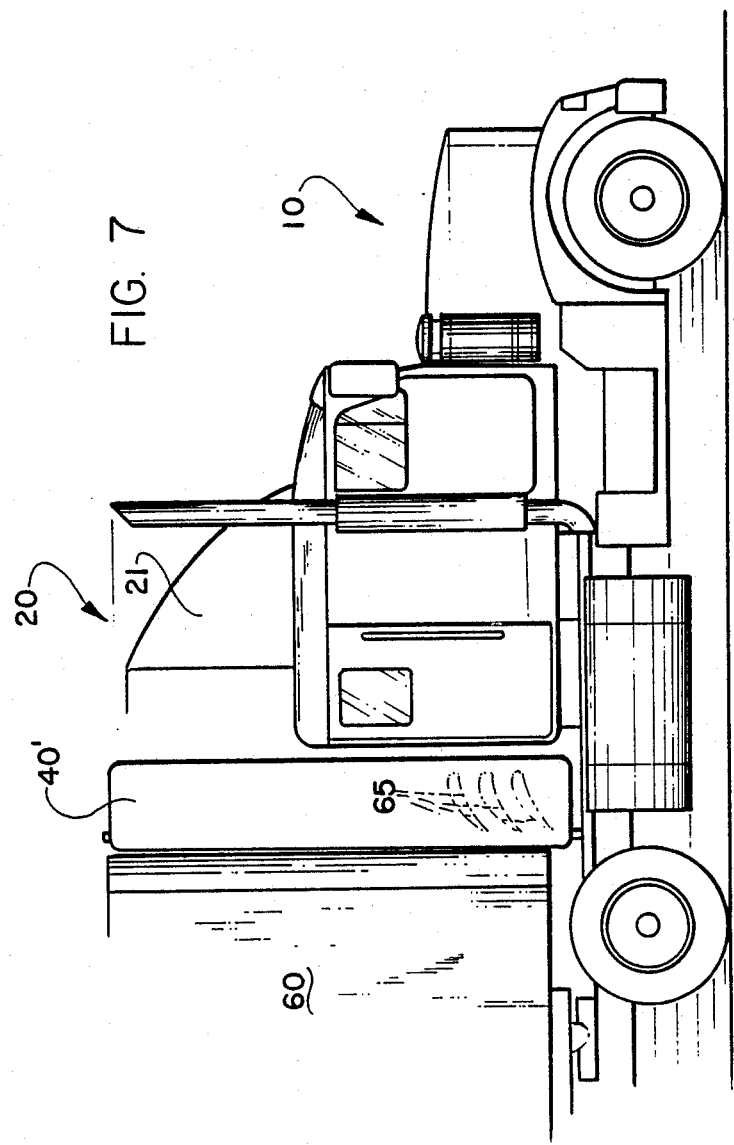

APPARATUS FOR SELECTIVELY VARYING AIR RESISTANCE ON A LAND TRANSPORT VEHICLE TO OPTIMIZE REDUCTION OF DRAG

TECHNICAL FIELD AND BACKGROUND OF THE INVENTION

This invention relates to an apparatus for controlling drag on land transport vehicles, prticularly tractor trailer trucks. Much progress has been made in reducing drag on tractor trailer trucks in the recent past. Substantial increases in diesel fuel prices have made such improvements necessary. New truck designs are much more streamlined than before, and deflectors have been designed to fit older trucks. One of the most significant reductions in drag was achieved when air deflectors were mounted on the cab roof of the tractors to deflect air over the top of the trailer. This deflection prevents air from passing unimpeded over the top of the relatively low roof of the tractor and impacting at right angles the front of the much taller trailer which projects over the top of the tractor cab roof.

Skirts have also been added to the rear sides of tractors to deflect air past the front of and along the sides of the trailer, instead of curling around the rear of the tractor and, as with the air over the top of the cab roof, impacting the front of the trailer. There are, however, drawbacks to these improvements, Most importantly, the reduced drag increases the braking distance of the vehicle, since drag is providing less stopping assistance. This is a particular problem in mountainous terrain where the air is less dense to begin with, and where trucks must brake constantly when traveling downhill.

In addition, while a roof mounted air deflector *reduces* drag when a tractor is pulling a conventional trailer which extends up over the height of the cab roof, it actually *increases* drag when the tractor is pulling no load, or a lower profile trailer such as a flatbed. Therefore, it is desirable to provide means of increasing or decreasing drag as is desirable to optimize the overall efficiency of the vehicle.

SUMMARY OF THE INVENTION

Therefore, it is an object of the invention to provide an apparatus for optimizing the drag of a land transport vehicle.

It is another object of the invention to provide a roof deflector for a vehicle which can be opened and closed as desirable to optimize drag.

It is another object of the invention to provide wings mounted on opposite sides of a cab and which can be opened to increase drag and direct the air onto the front of the trailer.

These and other objects of the present invention are achieved in the preferred embodiments disclosed below by providing an apparatus for selectively varying air resistance on a land transport vehicle to optimize reduction of drag except when drag is desirable as a speed reduction aid. The vehicle typically includes a can and at least one trailing cargo container. First and second wings are mounted on respective vertical axes on opposite sides of the cab adjacent the rear. Means are provided for moving the wings when desired between a first, relatively low drag position wherein the wings lie substantially flush with the sides of the cab and a second, relatively high drag position wherein the wings project outwardly beyond the sides of the cab and into the air stream moving past the cab to increase drag and reduce the braking distance of the vehicle.

According to one preferred embodiment of the invention, the means for moving the wings includes means for projecting the forward edge of the wings outward into the air stream for diverting the air stream inwardly and against the forward end of the cargo container.

According to another preferred embodiment of the invention, the wings are pivotally mounted adjacent their respective trailing ends whereby the forward edge of the wings pivot outwardly into the air stream for diverting the air stream inwardly.

Preferably, the means for moving the wings comprises at least one fluid-powered cylinder and piston assembly mounted on the cab and operably connected to the wings and the cylinder and piston assembly is powered by compressed air.

Preferably, the invention includes an air deflector mounted on the roof of the cab to normally deflect air over the top of the cargo trailer. The air deflector includes a relatively large opening therein for allowing air to freely pass therethrough and a door positioned in the opening and mounted for movement relative to the door. Means move the door between a first, relatively low drag position wherein the door covers the opening and air is deflected up and over the cargo container and a second, relatively high drag position wherein the door is retracted away from the opening and air is permitted to flow directly through the opening and against the forward end and top of the cargo container.

In accordance with yet another embodiment of the invention, first and second wings are mounted on respective vertical axes on opposite sides of the cargo container adjacent the front thereof. Means are provided for moving the wings when desired between a first, relatively low drag position wherein the wings lie substantially flush with the sides of the cargo container and a second, relatively high drag position wherein the wings project outwardly beyond the sides of the cargo container and into the air stream moving past the cargo container to increase drag and reduce the braking distance of the vehicle.

In accordance with yet another embodiment of the invention, the wings include deflectors projecting outwardly from the surface thereof and are angled to direct air downwardly in the direction of and onto the adjacent wheels and brakes of the vehicle.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 7 is a side view of one of the wings with deflectors thereon.

DESCRIPTION OF THE PREFERRED EMBODIMENT

Figure 1:
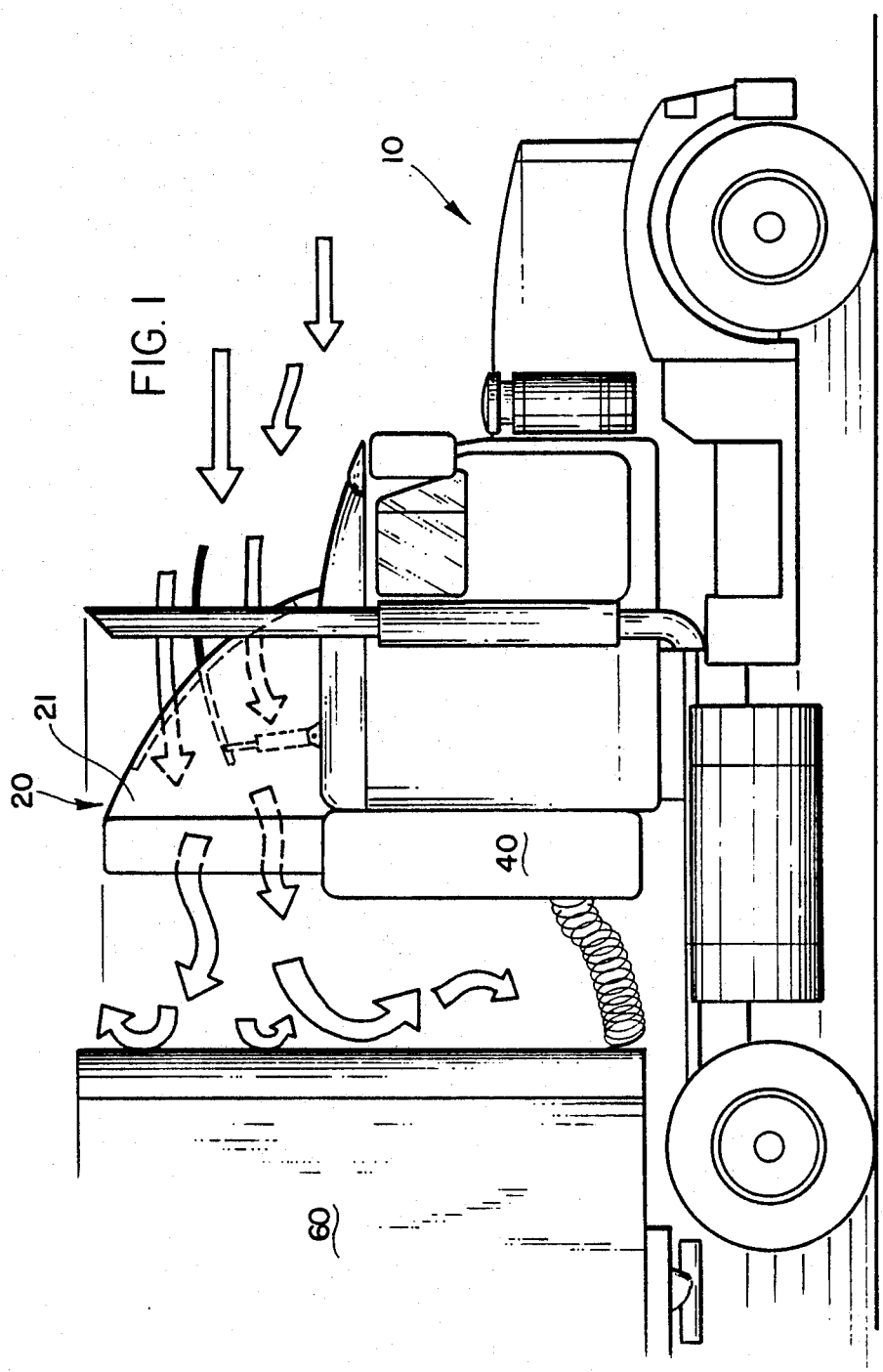
FIG. 1 is a side elevation of a tractor and attached trailer (partial) with side wings and a roof deflector (closed) according to the invention.
Figure 2:
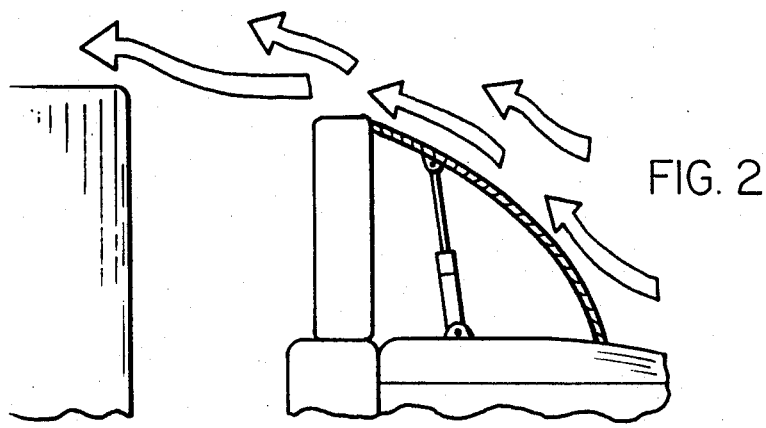
FIG. 2 is a fragmentary side elevation view showing the roof deflector in its closed position.
Figure 3:
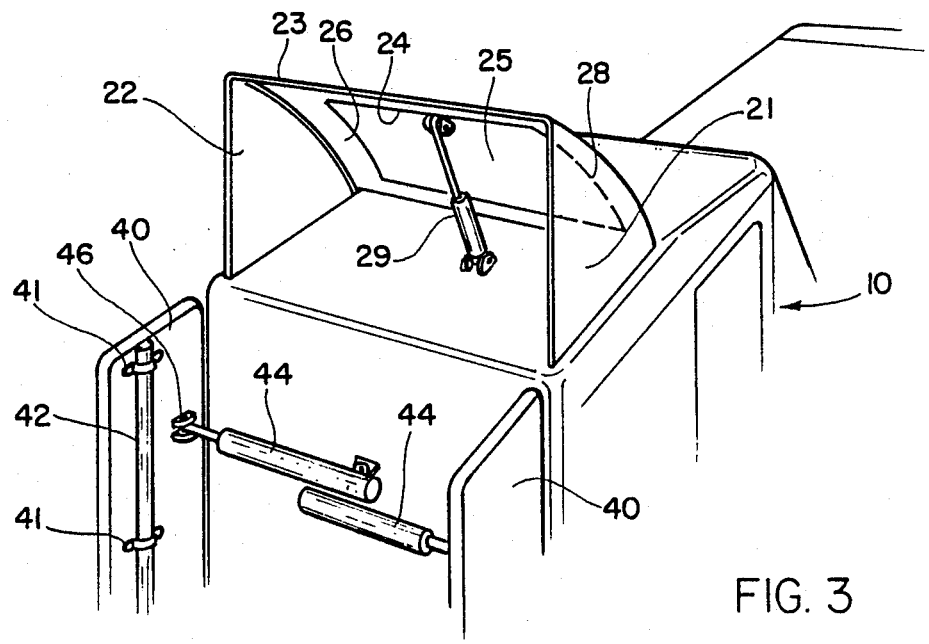
FIG. 3 is a fragmentary perspective view from the rear of the cab to the front showing means for moving the roof deflector and side wings.

Referring now specifically to the drawings, a tractor having an apparatus according to the present invention is illustrated in FIG. 1 and shown generally at reference numeral 10. The tractor 10 includes a roof deflector 20 and a pair of side wings 40 (one shown). The tractor 10 is shown pulling a conventional trailer 60 which extends well above the roof of the tractor 10. Conventionally, an air deflector continuously deflects air up and over the trailer. In the air deflector 20 as shown in FIGS. 1, 2 and 3, comprises a pair of spaced apart, vertical sidewalls, 21, 22. A curved front wall 23 is provided with an opening 24, into which is mounted a door 25 by a pair of pivots 26, 28. A air powered cylinder and piston assembly 29 is operated by the driver to move the door 25 between the open position shown in FIG. 1 and the closed position shown in FIGS. 2 and 3. The deflector 20 is used in the following manner. When the truck is pulling a trailer of the type trailer 60 shown in FIG. 1, the door 25 is closed and the air is deflected over the top of trailer 60, thereby substantially reducing drag. If additional braking power is needed, as when the truck is moving down a steep hill, the door 25 is opened, and air flows through the door 25 and impacts the front of trailer 60. This substantially increases drag on the vehicle and decreases the stopping distance and/or the amount of braking effort needed to maintain an appropriate speed. Of course, the door 25 can be connected to an automatic apparatus which opens or closes the door in response to some sensed condition, such as vehicle speed while braking, road grade or the like.

Likewise, when tractor 10 is not pulling a trailer, or is pulling a low profile trailer such as a flatbed, door 25 can be opened to allow air to pass straight through opening 24. This substantially reduces drag on the vehicle since the air which would otherwise be deflected by the deflector 25 would not, in any event, come into contact with a trailer.

Figure 5:
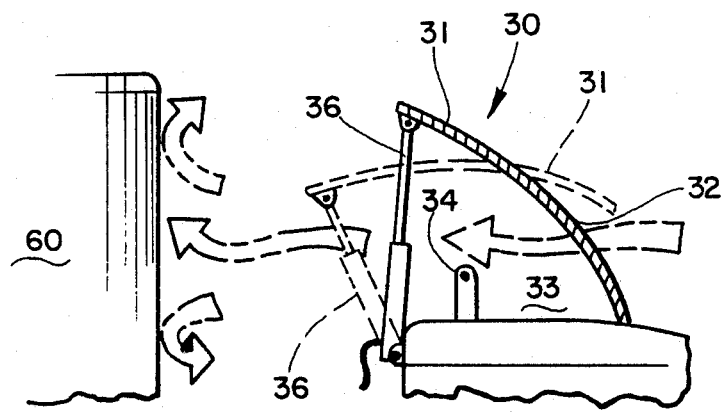
FIG. 5 is a fragmentary side elevation view another construction of a roof deflector according to the invention.

A variation on the structure shown in FIGS. 1, 2 and 3 is shown in FIG. 5. In FIG. 5, the entire front panel 31 of a deflector 30 is tilted open to permit air to flow through the opening 32 created by tilting the front panel 31. The front panel is supported on opposite sides by side panels 33, either a pivot 34 to which front panel supports (not shown) are attached, or sliding connection between the edges of the front panel 31 and the adjacent edges of side walls 33. The front panel is opened and closed by an air powered cylinder and piston assembly 36.

Referring again to FIG. 1, wings 40 are normally closed and lie substantially flush with the sides of tractor 10. The wings 40 extend back behind the cab of the tractor 10 and direct the air along the sides of the tractor to a point where most of the air will continue along the sides of the trailer 60 instead of curving inwardly into the low pressure area directly behind the tractor 10 and impacting against the front of the trailer.

Figure 4:
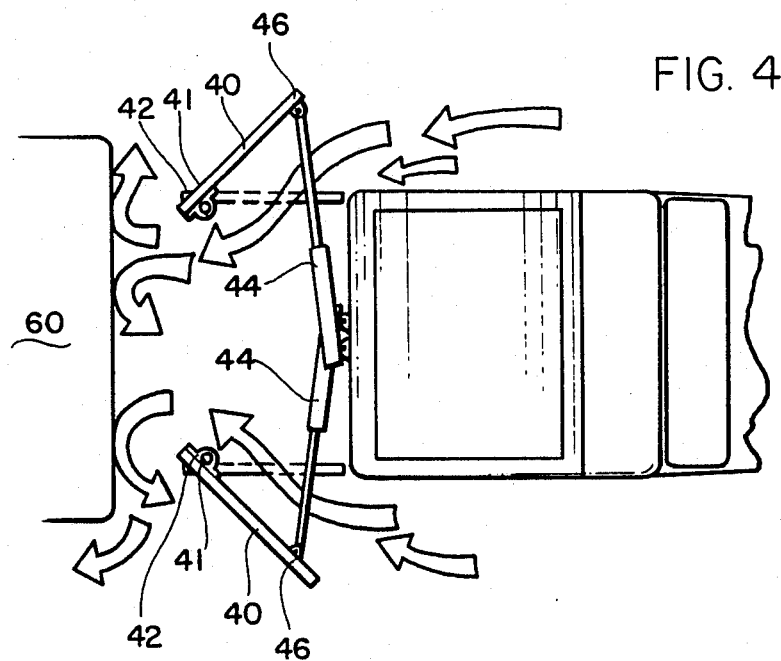
FIG. 4 is a top plan view showing the side wings in their open position to deflect air and add drag to the vehicle.

The wings 50 reduce drag significantly when in the closed position described above. However, there are conditions, as described above, where the reduction of drag is a disadvantage. In such conditions, the wings 40 may be pivoted into an open position where air is deflected into the area behind the tractor 10. This is illustrated in FIG. 4. Since both wings 40 are identical, like reference numerals are used to refer to common elements on both wings 40. Wings 40 are mounted by suitable brackets 41 on upright braces 42 around which doors 40 can rotate. Air powered cylinder and piston assemblies 44 are attached to respective wings 40 by a pivot mountings 46. The cylinder and piston assemblies 44 are controlled by the vehicle operator or automatically in response to a sensed condition, as described above.

As is shown in FIG. 4, opening the wings 40 outwardly into the slipstream of the tractor 10 deflects air inwardly and into contact with the front of trailer 60. This air creates significant drag on the vehicle and substantially reduces its stopping distance and the amount of braking required to reduce or maintain a desired speed.

Figure 6:
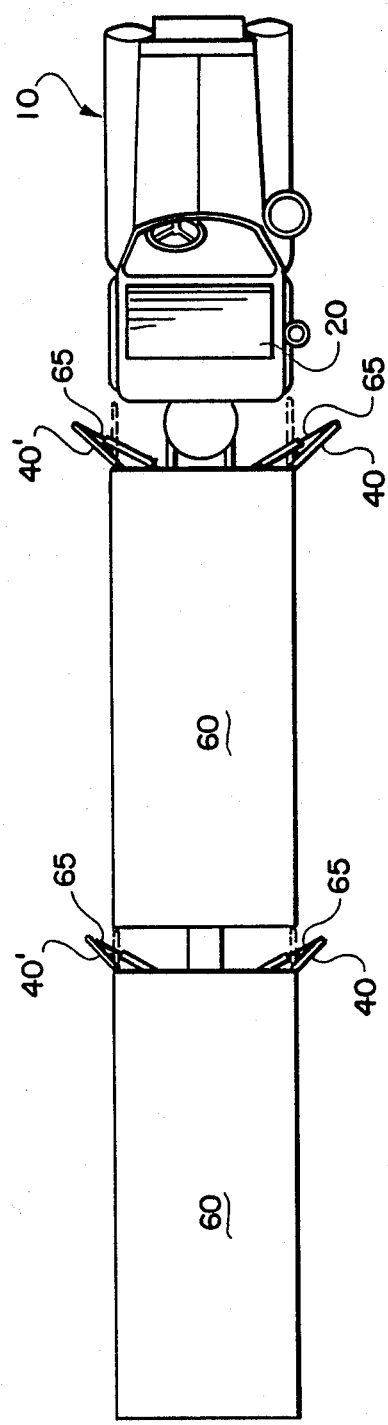
FIG. 6 is a top plan view of a vehicle according to one embodiment of the invention.

Alternatively, the wings 40 may be mounted on the front of the trailer 60 rather on the back of the tractor 10. This is shown in FIGS. 6 and 7, where the wings are designated as 40', indicating the same structure but in a different location. This location for wings 40' is particularly useful when the tractor has an extended sleeping compartment thereon and this is neither the need nor the room between the rear of the sleeper and the front of the trailer for the wings to be attached to the tractor. In other respects the mounting and operation is the same as described above and will not be further described.

As is shown in FIG. 7, several deflectors 65 are mounted on the inner facing surface of the wings 40' and extend outwardly substantially perpendicularly into the air stream when the wing 40' is extended in operating condition. Deflectors 65 are angled from and relatively high to low position from front to back, thereby directing air downwardly. Normally the wings are mounted relatively close to the wheels of the vehicle. Therefore, in addition to providing a braking effect to the vehicle, the additional air provides a positive cooling effect on the brakes. Deflectors 65 may be integrally molded in the structure of wing 40' or attached separately.

In the case of both the roof air deflector 20 and the wings 40 and 40', numerous other mounting and activating means can be used within the spirit of this invention, and the particular means described above are not exhaustive.

An apparatus for selectively varying air resistance on a land transport vehicle such as a tractor trailer truck, and a method of selectively varying air resistance is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. An apparatus for selectively varying air resistance on a land transport vehicle to optimize reduction of drag except when drag is desirable as a speed reduction aid, the vehicle including a cab and a trailing cargo container, said apparatus comprising:

(a) first and second wings mounted on respective vertical axes on opposite sides of said cab adjacent the rear thereof; and (b) means for moving said wings when desired between a first, relatively low drag position wherein said wings lie substantially flush with the sides of the cab and a second, relatively high drag position wherein said wings project outwardly beyond the sides of the cab and into the air stream moving past said cab to increase drag and reduce the braking distance of the vehicle, wherein said means for moving said wings includes means for projecting the forward edge of said wings outward into the air stream for diverting said air stream inwardly and against the forward end of said cargo container.

2. An apparatus according to claim 1, wherein said wings are pivotally mounted adjacent their respective trailing ends whereby the forward edge of said wings pivot outwardly into the air stream for diverting said air stream inwardly.

3. An apparatus according to claim 2, wherein said means for moving said wings comprises at least one fluid-powered cylinder and piston assembly mounted on said cab and operably connected to said wings.

4. An apparatus according to claim 3, wherein said cylinder and piston assembly is powered by compressed air.

5. An apparatus according to claim 2, wherein said means for moving said wings comprises a pair of compressed air cylinder and piston assemblies, with one of said assemblies moving a respective one of said wings.

6. An apparatus for selectively varying air resistance on a land transport vehicle to optimize reduction of drag except when drag is desirable as a speed reduction aid, the vehicle including a cab and a trailing cargo container, said apparatus comprising:

(a) first and second wings mounted on respective vertical axes on opposite sides of said cab adjacent the rear thereof;

(b) means for moving said wings when desired between a first, relatively low drag position wherein said wings lie substantially flush with the sides of the cab and a second, relatively high drag position wherein said wings project outwardly beyond the sides of the cab and into the air stream moving past said cab to increase drag and reduce the braking distance of the vehicle;

(c) an air deflector mounted on the roof of the cab to normally deflect air over the top of the cargo trailer, said air deflector including a relatively large opening therein for allowing air to freely pass therethrough;

(d) a door positioned in said opening and mounted for movement relative to said door; and (e) means for moving said door between a first, relatively low drag position wherein said door covers said opening and air is deflected up and over the cargo container and a second, relatively high drag position wherein said door is retracted away from said opening and air is permitted to flow directly through said opening and against the forward end and top of said cargo container, wherein said means for moving said wings includes means for projecting the forward edge of said wings outward into the air stream for diverting said air stream inwardly and against the forwrad end of said cargo container.

7. An apparatus according to claim 6, and including a fluid-powered cylinder and piston assembly mounted on said cab and operably connected to said door for moving the door.

8. An apparatus according to claim 7, wherein said wings are pivotally mounted adjacent their respective trailing ends whereby the forward edge of said wings pivot outwardly into the air stream for diverting said air stream inwardly.

9. An apparatus according to claim 8, wherein said means for moving said wings comprises at least one fluid-powered cylinder and piston assembly mounted on said cab and operably connected to said wings.

10. An apparatus according to claim 9, wherein said cylinder and piston assembly is powered by compressed air.

11. An apparatus according to claim 9, wherein said means for moving said wings comprises a pair of compressed air cylinder and piston assemblies, with one of said assemblies moving a respective one of said wings.

12. An apparatus for selectively varying air resistnace on a land trasnport vehicle to optimize reduction of drag except when drag is desirable as a speed reduction aid, the vehicle including a cab and a trailing cargo container, said apparatus comprising:

(a) first and second wings mounted on respective vertical axes on opposite sides of said cargo container adjacent the front thereof; and (b) means for moving said wings when desired between a first, relatively low drag position wherein said wings lie substantially flush with the sides of the cargo container and a second, relatively high drag position wherein said wings project outwardly beyond the sides of the cargo container and into the air stream moving past said cargo container to increase drag and reduce the braking distance of the vehicle, wherein said means for moving said wings includes means for projecting the forward edge of said wings outward into the air stream for diverting said air stream inwardly and against the forward end of said cargo container.

13. An apparatus according to claim 12, wherein said wings are pivotally mounted adjacent their repective trailing ends whereby the forward edge of said wings pivot outwardly into the air stream for diverting said air stream inwardly.

14. An apparatus according to claim 13, wherein said means for moving said wings comprises at least one fluid-powered cylinder and piston assembly mounted on said cargo container and operably connected to said wings.

15. An apparatus for selectively varying air resistance on a land transport vehicle to optimize reduction of drag except when drag is desirable as a speed reduction aid, the vehicle including a cab and a trailing cargo container, said apparatus comprising:

(a) first and second wings mounted on respective vertical axes on opposite sides of said vehicle in the area between the front of the cargo container and the rear of the cab;

(b) means for moving said wings when desired between a first, relatively low drag position wherein said wings lie substantially flush with the sides of the cargo container and a second, relatively high drag position wherein the forward edges of said wings project outwardly beyond the sides of the cargo container and into the air stream moving past said cab to increase drag and reduce the braking distance of the vehicle;

(c) an air deflector mounted on the roof of the cab to normally deflect air over the top of the cargo container, said air deflector including a relatively large opening therein for allowing air to freely pass therethrough;

(d) a door positioned in said opening and mounted for movement relative to said door; and (e) means for moving said door between a first, relatively low drag position wherein said door covers said opening and air is deflected up and over the cargo container and a second, relatively high drag position wherein said door is retracted away from said opening and air is permitted to flow directly through said opening and against the forward end and top of said cargo container.

16. An apparatus according to claim 15, wherein said wings include deflectors projecting outwardly from the surface thereof and angled to direct air downwardly in the direction of and on the adjacent wheels and brakes of the vehicle.

* * * * *